United States Patent [19]

Sigl

[11] Patent Number: 5,794,735
[45] Date of Patent: Aug. 18, 1998

[54] VEHICLE DECELERATION BY ENGINE CONTROL FOLLOWED BY BRAKE CONTROL

[75] Inventor: Alfred Sigl, Tokyo, Japan

[73] Assignee: Robert Bosch GmbH, Stuttgart, Germany

[21] Appl. No.: 640,971

[22] PCT Filed: Oct. 28, 1994

[86] PCT No.: PCT/DE94/01264

§ 371 Date: Jun. 27, 1996

§ 102(e) Date: Jun. 27, 1996

[87] PCT Pub. No.: WO95/13203

PCT Pub. Date: May 18, 1995

[30] Foreign Application Priority Data

Nov. 10, 1993 [DE] Germany ............... 43 38 399.8

[51] Int. Cl.$^6$ ............... B60K 31/00; B60K 26/00; B60K 28/00; B60T 8/32
[52] U.S. Cl. ............... 180/170; 364/424.083; 364/426.043
[58] Field of Search ............... 180/178, 179, 180/171, 197, 170; 303/155, 113.1; 364/424.083, 424.094, 426.029, 426.033, 426.036, 426.043; 123/349, 350

[56] References Cited

U.S. PATENT DOCUMENTS

| 4,583,611 | 4/1986 | Frank et al. | 180/197 |
| 4,884,203 | 11/1989 | Preis et al. | 364/426.04 |
| 4,953,093 | 8/1990 | Etoh | 180/170 |
| 5,166,881 | 11/1992 | Akasu | 180/170 |
| 5,575,542 | 11/1996 | Tanaka et al. | 180/170 |

FOREIGN PATENT DOCUMENTS

| 0145374 | 6/1985 | European Pat. Off. . |
| 33 31 297 | 3/1985 | Germany . |
| 37 03 645 | 8/1988 | Germany . |

Primary Examiner—Josie Ballato
Attorney, Agent, or Firm—Kenyon & Kenyon

[57] ABSTRACT

A method and a device are described for controlling a vehicle. The engine output is able to be influenced by a first control unit. The braking power is able to be influenced by a second control unit. Both control units cooperate along the lines of a vehicle speed control or a vehicle speed limitation. It is assessed on the basis of at least one of the variables, rpm, speed, acceleration, injected fuel quantity, and/or throttle valve position, whether it suffices to throttle back engine power in order to adhere to a setpoint speed. If indicated, the second control unit increases the braking power.

10 Claims, 3 Drawing Sheets

5,794,735

VEHICLE DECELERATION BY ENGINE CONTROL FOLLOWED BY BRAKE CONTROL

FIELD OF THE INVENTION

The present invention relates to a method and a device for controlling a vehicle, in particular the speed of the vehicle.

BACKGROUND INFORMATION

A method and a device for controlling a vehicle is described, e.g., by the German Patent Application No. 37 03 645 (U.S. Pat. No. 4,884,203). This German application relates to a method and a device for influencing the driving speed of a motor vehicle, whereby in dependence upon a driver's operator-control (driving mode selector) signals, the engine output is controlled with a view to observing a constant driving speed desired by the driver, in that a throttle valve provided in the air intake system of the internal combustion engine is adjusted in dependence upon the setting of an operating-control element actuated by the driver.

As a rule, such a cruise control ensures that the desired speed is maintained. However, when driving on a downhill grade, it can happen that it does not suffice to intervene in the engine output to maintain the desired speed, because the vehicle is traveling faster.

If the driver actuates the operating control element to reduce the setpoint speed, the vehicle is then decelerated or the driving speed is only reduced on a plane (level) or uphill road surface. When traveling downhill, it is possible that one single intervention in the engine output control does not suffice to decelerate the vehicle. Since the cruise control is usually switched off when the brake is activated, the driver must himself intervene in this case by activating the brake and, subsequently reset the cruise control.

An object of the present invention is to devise a more user-friendly cruise control to allow the desired driving speed to be maintained, even when traveling on downhill grades.

The German Patent Application No. 33 31 297 (U.S. Pat. No. 4,583,611) describes a device for preventing the driven wheels of a vehicle from spinning. When working with this control device, the rotary speed of the driven wheels is compared to a reference signal. If it is determined that the rotary speed of the wheels deviates from the reference signal, a slip signal is generated. In response to a slip signal, the device produces a signal for activating the brake of the corresponding driven wheel.

SUMMARY OF THE INVENTION

A substantially more user-friendly cruise control can be realized, due to an assessment on the basis of at least one of the signals, rpm, speed, acceleration, throttle valve position, and/or injected fuel quantity, whether it suffices to throttle back engine power in order to adhere to a setpoint speed and, in some instances, and whether a second control unit is needed to increase the braking power.

The device according to the present invention relieves the driver from some of his tasks, since he no longer has to activate the brake to keep the driving speed constant when driving on a downhill grade. Furthermore, when working with systems with vehicle-speed limitation, it is ensured that the speed limit can be observed, even when driving downhill.

When working with the device and method according to the present invention, it is not necessary when driving on downhill grades for the driver to activate the brake in order to adjust the desired speed. Also, the driver is spared from resetting the cruise control following a braking intervention.

DETAILED DESCRIPTION OF THE INVENTION

Figure 1:
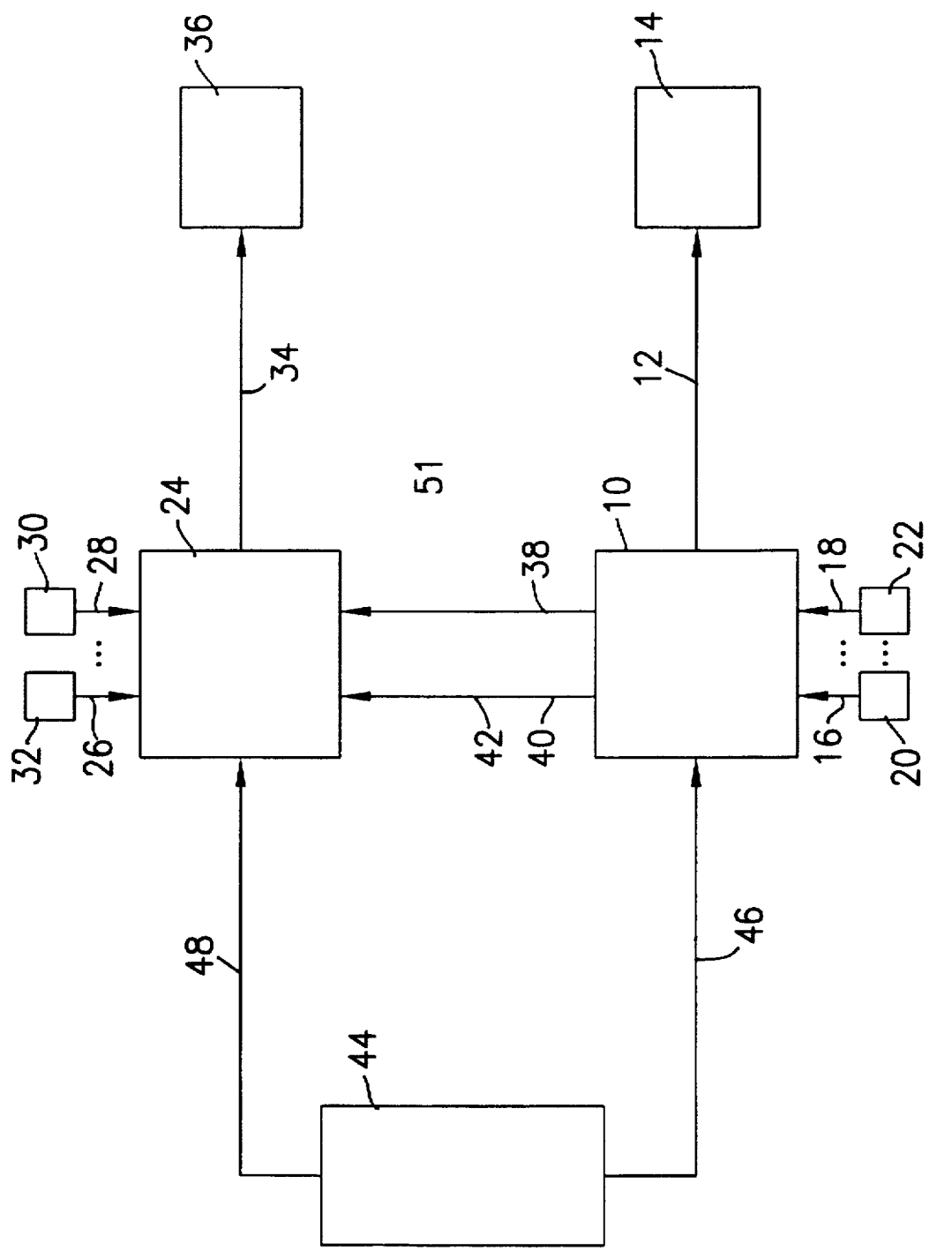
FIG. 1 shows a block diagram of an exemplary embodiment of a control system in a vehicle according to the present invention.

FIG. 1 shows a first control unit 10, which, via an output line 12, controls a device or devices 14 for controlling the engine output of an internal combustion engine, such as a throttle valve, fuel metering, ignition, control rod, injection pump, etc. The internal combustion engine is preferably used for driving a vehicle.

The control unit 10 can be, e.g., an electronic engine-power control (electronic gas pedal), a fuel-metering device (Motronic), an electronic diesel control (EDC). Input lines 16 through 18 lead to the control unit, connecting them to measuring devices 20 through 22 for detecting engine and/or vehicle performance quantities. This first control unit 10 influences the engine output of the vehicle.

In addition, a second control unit 24 is provided, which is connected by input lines 26 through 28 to measuring devices 30 through 32, which likewise detect performance quantities of the engine and/or of the vehicle. By way of an output line 34, the control unit 24 intervenes in at least one control element 36 of a braking device of the vehicle. This second control unit 24 influences the braking power of the vehicle.

The control unit 24 is preferably an ABS (Anti-Lock Braking System) control unit and/or an ASR (Anti-Spin Regulation or Traction Control) control unit. To exchange information, the two control units 10 and 24 are interconnected via an interface, which is shown in the general block diagram by the two lines 38 and 40. A switch 42, which symbolically represents a possibility for the interface to be switched off by the driver or by a master control unit, is sketched in the line 40.

Furthermore, an operating control element 44 is depicted, from which a line 46 leads to the control unit 10 and, in this exemplary embodiment, a line 48 to the control unit 24. The operating control element 44 may be a cruise control element, as well as, possibly, a control element for activating the brake.

In another exemplary embodiment of the present invention, the interface between the control units consists merely of a line.

The two control units cooperate in the sense of a driving speed control or an engine speed limitation. The method of functioning of the system depicted in FIG. 1 is illustrated, for example, as follows.

Depending on the actuation of the gas pedal by the driver and, in some instances, upon the performance quantities detected by the measuring devices 20 through 22, such as throttle-valve position, engine temperature, engine rpm, driving speed, etc., the control unit 10, when working with an electronic engine output control, generates a trigger signal for the final controlling element 14, which influences the power output. In the case of an Otto (spark-ignition)

engine, the final controlling element 14 may be a throttle valve, and in the case of a diesel engine, the final controlling element 14 may be an injection pump.

As a rule, the cruise control and/or the vehicle-speed limiter are included within the scope of functioning of such a control unit. One advantageous embodiment of the present invention provides for this control unit or for another control unit linked to this control unit to limit and/or automatically control the distance to the vehicle driving ahead.

The operating control element 44 has available the functional positions for implementing the cruise control function, such as "accelerate", "decelerate", "set", "resume", "off". In dependence upon the function desired by the driver, the control unit 10, through adjustment of the final controlling device 14, controls the speed of the vehicle to the value specified by the driver, or accelerates or decelerates the vehicle in accordance with the function specified by the driver via the operating control element 44.

As a rule, the cruise control ensures that the speed set is observed by influencing the engine output via the control unit 10; it is only in a few operating states, such as when driving on downhill grades, that the adjusted speed is exceeded, i.e. when the control unit 10 has reduced to engine output to a minimal value, e.g. zero, without the speed having attained the adjusted value.

The vehicle-speed limiter has a comparable function. The driver stipulates a maximum speed via the operating control element 44. The driver controls the engine output by actuating the gas pedal. If the vehicle speed exceeds the preset value, then the vehicle-speed limiter reduces the engine output independently of the gas pedal actuation. Here, as well, when driving on downhill grades, it can happen that the speed is no longer able to be maintained through an intervention in the engine output, as this intervention has already been completely exhausted.

An engine speed (rpm) limiter has a comparable functioning, as it can likewise be drawn upon to limit vehicle speed under the consideration of the gear (transmission) ratio, or is used to limit the engine rpm to a maximum value.

In addition to that, there is a maximum limitation of the maximum speed.

Therefore, in an exemplary embodiment depicted of the present invention shown in FIG. 1, information pertaining to the vehicle speed control is transmitted via the lines 38 and 40, i.e. via the interface, to the control unit 24. A measure of the adjusted engine output is transmitted via the line 40 to the control unit 24 and, e.g., given a minimal adjustment, the control unit 24 is activated to intervene in a brake 36. In response to the information conveyed via the line 40, the two control units are interlocked. Information concerning the operating state of the control unit 10 (e.g., cruise control active) and the setpoint/actual deviation can be transmitted via the line 38.

The intervention in a braking device is preferably carried out as a function of the difference between the setpoint and actual speed and leads to the braking device 36 being influenced to adhere to the setpoint speed through the actual speed.

In the exemplary embodiment of the present invention, the control unit 24 is an ABS/ASR control unit, which controls the brakes of the vehicle by influencing the pressures in the brake lines. The functioning of a control unit for traction control (ASR) is as follows. The control unit detects a rotary speed of all the wheels and compares the speed values to an ASR reference speed. If the speed of one of the wheels exceeds this reference speed, then the control unit activates the brake of the appropriate wheel to increase the braking torque and/or the brake pressure.

In the exemplary embodiment according to the present invention shown in FIG. 1, the interface is comprised of two lines 38 and 40, over which are transmitted, on the one hand, a control signal (line 38) and, on the other hand, status information to the control unit 10 (line 40). Using a symbolically sketched switching element 42, the driver or a master control unit can switch off the interface to allow the normal functions described above to proceed separately from one another. However, in one embodiment of the present invention, the two lines 38 and 40 can be combined in one line.

Figure 2:
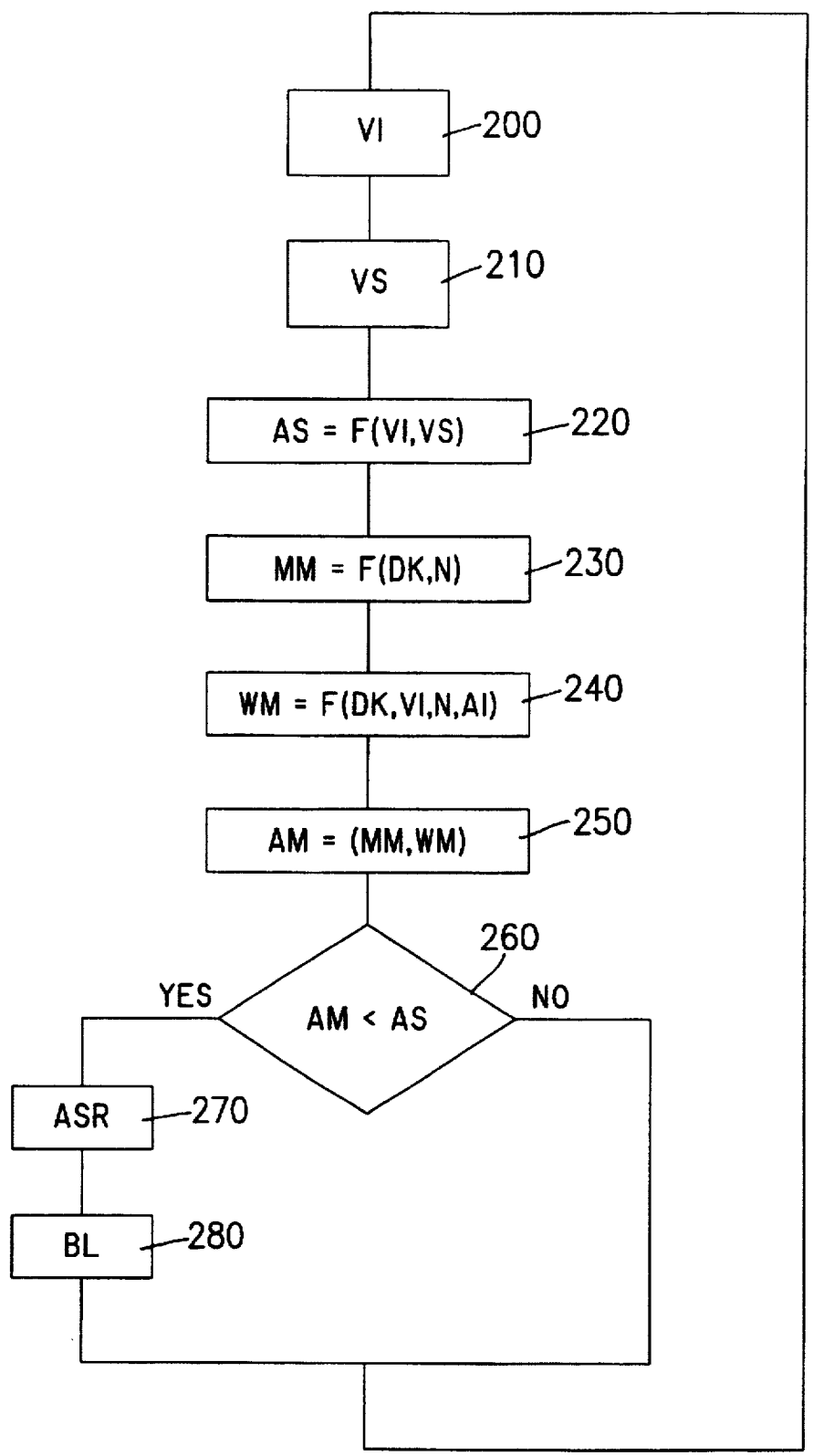
FIG. 2 shows a flow chart for illustrating the method according to the present invention.

FIG. 2 shows a flow chart to elucidate the procedure according to the present invention. The instantaneous travel speed VI is detected in step 200. If indicated, the setpoint value VS for the speed of the vehicle is reset in step 210. This can take place, e.g., in that the driver specifies a new desired speed via the operating element. In step 220, the setpoint deceleration AS required to attain the setpoint speed VS is calculated starting from the actual speed VI. This setpoint deceleration AS follows from the actual instantaneous speed VI and the desired speed VS, as well as from the time during which the speed is to be adjusted.

The instantaneous engine torque MM is subsequently calculated in step 230 starting from the instantaneous throttle-valve position DK and (engine speed) N. This engine torque is preferably stored in an engine characteristics map as a function of the two variables, throttle-valve position DK and rpm N. In step 240, a tractive resistance torque WM is determined as a function of the throttle-valve position, of the current driving speed VI, of the rpm and, in some instances, of the current acceleration AI.

The engine torque MM corresponds to the moment of rotation made available by the engine. It only has positive values. The tractive resistance torque WM is that torque that counteracts the engine torque. Given a constant driving speed, these two torques are equivalent.

When driving uphill or on a level road, the tractive resistance torque WM will always be less than zero and effect a vehicle deceleration. On the other hand, when driving downhill, the tractive resistance torque WM can assume positive values, which will result in a vehicle acceleration. In response to positive values of the tractive resistance torque WM, the driving speed increases, even when the engine torque is zero. An operation at a constant driving speed without an additional braking torque is not possible.

Starting out from the tractive resistance torques WM and the engine torque MM, a possible deceleration AM is specified in step 250. This possible deceleration AM indicates by which amount the vehicle can be decelerated when the throttle valve is completely closed and the engine torque thus becomes zero.

The query 260 checks whether the possible deceleration is less than the setpoint deceleration AS. If this is the case, this means the target speed VS cannot be reached, so that in step 270, the cruise control 10 emits a corresponding signal to the ABS/ASR control unit 24. If indicated, the brake lights are triggered in step 280. In response to an adequate deceleration or after activation of the ASR control unit, program step 200 follows again with the current rpm being detected.

It is checked according to the present invention whether the tractive resistance torque calculated on the basis of the throttle-valve position, the vehicle speed and, possibly, the vehicle acceleration, suffices to achieve the desired speed.

To this end, the engine torque is determined on the basis of the rpm and the throttle-valve position. It is decided on the basis of the engine torque and the tractive resistance torque whether an active braking is to be initiated.

In so doing, one must essentially differentiate between two cases. When driving on a downhill grade, the tractive resistance torque becomes greater and even assumes positive values. In this case, the vehicle accelerates and the actual speed becomes greater than the setpoint speed. In this case, it has to be checked whether just taking away the engine torque will suffice to maintain a constant driving speed.

When driving on a downhill grade, the driver specifies a lower setpoint speed. In this case, the actual speed is likewise greater than the setpoint speed. It must be checked whether just taking away the engine torque will suffice to achieve a deceleration.

Instead of the throttle-valve position, one can use other load signals, such as the injected fuel quantity, or in the case of diesel gasoline engines, for example, the control rod position.

There are several possible ways for the braking desired by the cruise control to be signaled to the ASR control unit. Thus, for example, a preferably digital deceleration signal can be transmitted. A certain signal level signals may indicate that the first control unit 10 desires a braking intervention. Other signal level may indicate that the first control unit 10 does not desire any braking intervention.

Furthermore, the transmission of a preferably analog deceleration value is possible. In this case, the desired braking effect is preferably proportional to the signal level.

Furthermore, the cruise control 10 can transmit a braking torque or a brake pressure as a digital and/or analog signal to the second control unit 24.

It is also possible for a target speed to be transmitted to the ASR control unit. This target speed influences the ASR reference speed along the lines of a reduction. The consequence of the reduced ASR reference speed is then a braking intervention.

Since an active braking intervention is relevant to safety, the transmission preferably takes place by means of two signals. It is possible for an analog deceleration signal and a target speed to be specified.

Figure 3:
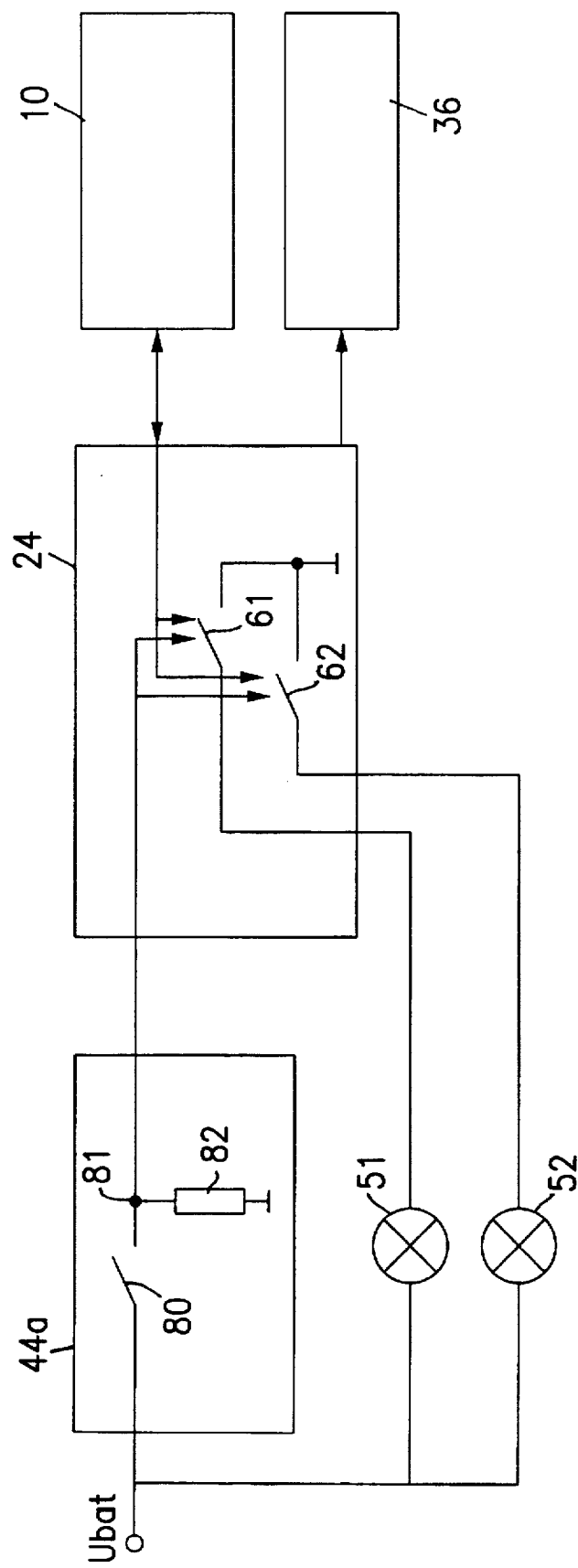
FIG. 3 shows a block diagram of another embodiment of the present invention.

It is also possible when the active braking intervention is signaled, to generate a traffic indication by switching on the brake light in step 280. Since switching on the brake lights by means of a relay contact in parallel to the usual brake light switch influences the sensing of the driver's desired braking, another embodiment according to the present invention is illustrated in FIG. 3 as a block diagram.

The operating control element 44 comprises a desired-braking sensing device 44a, which is connected to a battery voltage $U_{bat}$. Furthermore, the desired-braking sensing device 44a applies a signal indicating a brake activation to the second control unit 24. In addition, at least two parallel-connected brake lights 51 and 52 are connected to the battery voltage $U_{bat}$. The two other connections of the brake lights are linked to the second control unit 24.

In dependence upon whether an actuation of the braking signal is at hand or not, the desired-braking sensing device 44a generates two different signal values. In the simplest realization, the desired-braking sensing device 44a comprises a switch 80. This switch 80 is connected by its one pole to the battery voltage and by the other via a resistor 82 to ground. The shared point between the resistor 82 and the switch 80, is connected to the output of the desired-braking sensing device 44a.

The brake light 51 is connected via a switching means 61 to ground. The brake light 52 is likewise connected via a switching means 62 to ground. The switching means 61 and 62 are preferably integrated in the second control unit 24. Preferably, semiconductor switches or relays are used as switching means 61 and 62.

When the brake is not activated, the switch is in its opened position and the interconnection point 81 is connected to frame potential. When the brake is activated, the switch 80 closes, so that the interconnection point 81 is connected to battery potential. A positive potential at the point 81 indicates an activated brake. A zero potential at the point 81 indicates that, at the moment, no braking is desired by the driver.

In dependence upon the safety and function requirements, the sensing of desired braking can also be conceived differently. To enhance safety and to compensate for a switch failure, it is also possible to provide two switches. In place of the switch, it is also possible to use one potentiometer. To further augment safety, two potentiometers can also be used.

The two switches are preferably so triggered by the control unit 24 that they are closed during a brake activation and illuminate the brake lights 51 and 52. A brake activation is recognized and the switches are triggered when the desired-braking sensing device 44a indicates a braking activation. This means that a positive potential is applied to the interconnection point 81. On the other hand, the control unit 24 also triggers the switches when the ABS/ASR control unit 10 desires a braking intervention.

The advantage offered by this procedure is that the desired-braking sensing is completely separate from the "active braking intervention" indication. This will make it possible to avoid any reciprocal influencing. Furthermore, the performance reliability of the brake lights is able to be monitored very easily by the second control unit 24. If one does without the monitoring function, just one switching means can then be used instead of the two switching means 61 and 62.

What is claimed is:

1. A method for controlling a vehicle, the vehicle including a first control unit for controlling an engine power and a second control unit for controlling a braking power, the first control unit and the second control unit cooperating to control a travel speed of the vehicle, the method comprising the steps of:

determining an engine torque and a tractive resistance torque;

decreasing the engine power with the first control unit as a function of the tractive resistance torque and the engine torque, in order to decrease the travel speed of the vehicle toward a setpoint speed; and increasing the braking power with the second control unit if decreasing the engine power does not conform the travel speed to the setpoint speed.

2. The method as recited in claim 1, wherein the tractive resistance torque is read out from an engine characteristics map, the tractive resistance torque being determined as a function of at least one of the travel speed, a vehicle acceleration, a throttle-valve position and an injected fuel quantity.

3. The method as recited in claim 1, wherein the engine torque is read out from an engine characteristics map as a function of one of a revolutions-per-minute signal, a throttle-valve position and an injected fuel quantity.

4. The method as recited in claim 1, wherein the first control unit transmits a braking signal to the second control unit for increasing the braking power, and the braking signal being transmitted depending on a comparison of the engine torque with the tractive resistance torque.

5. The method as recited in claim 1, further comprising the step of:

transmitting a braking signal for increasing the braking power to the second control unit, the braking signal being one of a digital deceleration signal, an analog deceleration signal and a first signal, the first signal being for generating one of a brake pressure and a braking torque.

6. The method as recited in claim 1, wherein the travel speed is transmitted to the second control unit as a braking signal, the travel speed being used for determining an anti-speed regulation reference speed.

7. The method as recited in claim 1, wherein the step of increasing the braking power is indicated by at least one brake light device.

8. A device for controlling a vehicle, comprising:

(a) a first control unit for controlling an engine power;

(b) a second control unit for controlling a braking power, the first control unit cooperating with the second control unit for one of controlling and limiting a speed of the vehicle;

(c) a measuring device for detecting a travel speed and a setpoint speed of the vehicle; and (d) an evaluating device for determining an engine torque and a tractive resistance torque, the first control unit varying the engine power as a function of the tractive resistance torque and the engine torque, the engine power being varied for substantially matching the travel speed with the setpoint speed, the second control unit increasing the braking power if the setpoint speed cannot be matched with the travel speed by varying the engine power.

9. The device as recited in claim 8, further comprising at least one brake light having a first and a second connection, the first connection being coupled to a supply voltage, the second connection being coupled to a ground through at least one switch, the at least one switch being actuated by the second control unit.

10. The device as recited in claim 8, wherein the second control unit includes at least one of an Anti-Lock Braking System control unit and an Anti-Slip Regulation control unit.

* * * * *

UNITED STATES PATENT AND TRADEMARK OFFICE
CERTIFICATE OF CORRECTION

PATENT No. : 5,794,735

DATED : August 18, 1998

INVENTOR(S): Alfred Sigl

It is certified that error appears in the above-identified patent and that said Letters Patent is hereby corrected as shown below:

Column 3, line 43, after "embodiment" delete "depicted";

Column 4, line 27, before (engine speed) insert --rpm--;

Column 5, lines 53 and 57, "$U_{bar}$." should be --$U_{bat}$--; and

Column 5, line 66, after "80" insert --,--.

Signed and Sealed this

Sixth Day of April, 1999

Attest:

Q. TODD DICKINSON

*Attesting Officer*     *Acting Commissioner of Patents and Trademarks*